United States Patent

Yunck et al.

[11] Patent Number: 5,828,336
[45] Date of Patent: Oct. 27, 1998

[54] ROBUST REAL-TIME WIDE-AREA DIFFERENTIAL GPS NAVIGATION

[75] Inventors: Thomas P. Yunck, Pasadena; William I. Bertiger, Altadena; Stephen M. Lichten, Pasadena; Anthony J. Mannucci, Pasadena; Ronald J. Muellerschoen, Pasadena; Sien-Chong Wu, Torrance, all of Calif.

[73] Assignee: The United States of America as represented by the Administrator of the National Aeronautics and Space Administration, Washington, D.C.

[21] Appl. No.: 628,566

[22] Filed: Mar. 29, 1996

[51] Int. Cl.$^6$ .............................. H04B 7/185; G01S 5/02
[52] U.S. Cl. ............................... 342/357; 701/214
[58] Field of Search ..................... 342/357; 364/449.9; 701/214

[56] References Cited

U.S. PATENT DOCUMENTS

| | | | |
|---|---|---|---|
| 4,894,662 | 1/1990 | Counselman | 342/357 |
| 5,323,322 | 6/1994 | Mueller et al. | 342/357 |
| 5,590,043 | 12/1996 | McBurney | 364/449.1 |
| 5,596,328 | 1/1997 | Stangeland | 342/357 |

*Primary Examiner*—Theodore M. Blum
*Attorney, Agent, or Firm*—John H. Kusmiss

[57] ABSTRACT

The present invention provides a method and a device for providing superior differential GPS positioning data. The system includes a group of GPS receiving ground stations covering a wide area of the Earth's surface. Unlike other differential GPS systems wherein the known position of each ground station is used to geometrically compute an ephemeris for each GPS satellite, the present system utilizes real-time computation of satellite orbits based on GPS data received from fixed ground stations through a Kalman-type filter/smoother whose output adjusts a real-time orbital model. The orbital model produces and outputs orbital corrections allowing satellite ephemerides to be known with considerable greater accuracy than from the GPS system broadcasts. The modeled orbits are propagated ahead in time and differenced with actual pseudorange data to compute clock offsets at rapid intervals to compensate for SA clock dither. The orbital and clock calculations are based on dual frequency GPS data which allow computation of estimated signal delay at each ionospheric point. These delay data are used in real-time to construct and update an ionospheric shell map of total electron content which is output as part of the orbital correction data, thereby allowing single frequency users to estimate ionospheric delay with an accuracy approaching that of dual frequency users.

16 Claims, 9 Drawing Sheets

STANDARD BASIS FUNCTION FOR $C^2$ CUBIC SPLINE FUNCTIONS

ROBUST REAL-TIME WIDE-AREA DIFFERENTIAL GPS NAVIGATION

ORIGIN OF THE INVENTION

The invention described herein was made in the performance of work under a NASA contract, and is subject to the provisions of Public Law 96-517(35 U.S.C. §202) in which the Contractor has elected not to retain title.

TECHNICAL FIELD

The present field is in the field of navigation and positioning and, more particularly, in the field of a differential Global Positioning System (GPS) process and device whereby greatly improved navigation information can be procured with use of the currently available GPS.

BACKGROUND ART

Currently, the most popular way of obtaining precise positioning information anywhere on the Earth is use of GPS. This system relies on a constellation of Earth orbiting satellites that constantly broadcast positioning information and are so arranged in their orbits that at least four satellites are simultaneously visible from essentially any point on or near the Earth's surface. While a brief summary of this system is presented to form the necessary framework for the present invention, this explanation does not pretend to be comprehensive or precise. A more exhaustive explanation of GPS with references can be found in "GPS Satellite Surveying" by Alfred Leick, Wiley-Interscience, New York, 1990, which is incorporated herein by reference.

In brief, GPS depends on the ability of modern electronics to accurately measure the time a radio signal takes to travel from an orbiting GPS satellite to a ground receiver. Multiplying this measured transit time by the speed of electromagnetic radiation, one obtains a pseudorange, an apparent distance, from the satellite to the receiver. Various errors and uncertainties alter this measurement from a single point into a statistical range which includes the most likely actual distance from the satellite to the receiver.

If the pseudoranges to at least four satellites are simultaneously acquired, the four ranges overlap to define coordinates of an elliptical three-dimensional space which includes the receiver with considerable accuracy. The original specifications of the GPS system were to provide two levels of results, a high accuracy result that was within 10 meters or so of the true position, and a lower accuracy result that was within about 100 meters of the true position. This two-tiered approach was dictated by military considerations: the high accuracy result was to be available only to the military, while the low accuracy result was available for civilian purposes. General civilian users either lack access to the high accuracy system or the accuracy of the available system is purposefully degraded.

In actual practice, methods have been developed to greatly improve the accuracy of GPS over the original specifications. To appreciate these advances it is necessary to discuss some of the sources of error in GPS measurements. These errors can be looked at as being of two major types. The first type of error directly impacts the measurement of the pseudorange from the GPS satellite to the receiver.

At the simplest level the pseudorange is determined by measuring how long it takes for a signal to travel from the satellite to the receiver. This measurement is made possible by placing highly accurate clocks in the satellite and providing means to synchronize receiver clocks on the ground to the satellite clock. In this way it is possible to determine the time taken for signal transit. Errors in either the satellite clocks or the receiver clock alter the measured pseudorange because both clocks must be exactly synchronous to determine the actual transit time of the broadcast signal. At the speed of electromagnetic radiation the signal travels about 30 cm in one nanosecond. Also, the clocks must be sufficiently stable over the period of one measurement that clock drift does not degrade the accuracy of the resulting pseudorange.

Lack of stability or synchrony of the clocks will result in an inaccurate measurement of signal transit time. When this is multiplied times the speed of electromagnetic radiation, an error in pseudorange, or apparent distance, will result. Thus, if positioning measurements are to be accurate to within a meter, the relative clock offsets must be known to about 3 nsec ($3 \times 10^{-9}$ sec).

In actual practice the clocks are constantly updated and corrected by control broadcasts from the ground. The stability of the satellite clocks is, therefore, more than adequate over the period of a single measurement. Although the receiver clocks may be considerably less stable, they, too, can be constantly updated, thereby providing adequate stability for positioning results with accuracy better than one meter.

A second significant source of pseudorange error is in the value representing the propagation speed of electromagnetic radiation. While the propagation speed of electromagnetic radiation is constant in a vacuum, it is retarded by passage through matter such as air in the atmosphere. The Earth's atmosphere has two major regions affecting signal transmission: the troposphere, which represents the "ordinary" air up to an elevation of about 40 km from the surface; and the ionosphere, which contains free electrons and extends from 100 km to about 1000 km. The amount of speed alteration (delay) caused by the air of the troposphere will depend on the thickness of the air layer traversed. Signals from a GPS satellite at the zenith will be delayed an amount equivalent to about 2 m pseudorange. At a five-degree angle from the horizon the delay will be increased to between about 20 and 30 meters. This delay can be calculated from the elevation angle of the satellite and, thus, can be largely compensated for.

The temperature, as well as the amount of water (either as vapor or as liquid droplets), will significantly affect the magnitude of signal delay caused by the troposphere. Considerable effort has gone into producing atmospheric models that estimate delay caused by these factors. The basic atmospheric gases (dry part) of the troposphere contribute around 90% of the delay. Current methods allow correction of this dry delay to within ±1% of the correct value. The remaining delay caused by water amounts to as much as 30 cm at midlatitudes, but can generally be corrected by measurement and/or modeling to less than 5 cm.

The ionosphere contains free thermal electrons liberated from atoms of air by solar radiation. The ionosphere delays different frequencies of electromagnetic radiation to differing extents. In the case of GPS signals the lower frequency modulated signal is retarded relative to the carrier frequency. The phase of the carrier frequency actually appears to be advanced over transmission in a vacuum. This frequency dependence follows a precise rule and can be used in GPS to precisely correct for a significant amount of the ionospheric retardation. The satellites broadcast GPS signals on two different coherent frequencies (derived from a common clock). This allows solution of a simultaneous equation which effectively removes ionospheric retardation. However, simpler GPS receivers operate on only one frequency and are unable to take advantage of this ionospheric correction.

In actual GPS measurements the distance (pseudorange) from the GPS satellite to the receiver can also be derived by determining the phase of the carrier wave of the signal, as well as by measuring the transit time of the signal. The wavelength of the frequencies used in GPS is around 20 cm. Thus, by counting the number of cycles between the satellite and the receiver, measurements of better than 20 cm can be made. The problem is that while the receiver can readily determine the fraction of the phase cycle (i.e., that portion of the distance that is less than an integer number of wavelengths), there remains a significant ambiguity surrounding the exact integer number of wavelengths. However, one possible solution is to use pseudorange to determine the integer number and use the exact phase measurement to provide the "fine" measurement of between zero and one wavelength.

Thus far we have summarized the major sources of "natural" error affecting accurate determination of distance between a GPS satellite and a GPS receiver. Of course, even if the distance is known exactly, additional information is required to determine the position (i.e., geographical coordinates) of the receiver. As mentioned above, accurate distance measurements from at least four GPS satellites allow one to determine the coordinates of the GPS receiver, but subject to errors in knowledge of the position of each satellite (the ephemeris). It is intuitively obvious that the determined coordinates for the receiver cannot be much more accurate than the accuracy of the satellite positions.

Thus, the second type of GPS error is an error in the "known" positions of the satellites. The GPS satellites are constantly tracked by ground stations and precise orbital positions are continually determined. This positional information is uploaded to each satellite which, in turn, broadcasts positional information as part of the GPS signal.

It can be appreciated that determining and predicting the exact satellite positions is subject to a large number of potential errors. Although the mathematics of orbital mechanics are well known, the GPS satellites are influenced by gravitational effects of the Earth, Moon, and Sun. The Earth itself is deformed by tidal effects so that its waters and, to a lesser extent, its solid mass, change shape due to external gravitational pulls and rotation of the planet. These deformations, in turn, affect the satellite orbits. Even solar pressure due to solar photons striking the satellites has a significant effect in altering the velocity of the satellites.

Apart from the "natural" errors in pseudorange determination and in determination of precise satellite positions, the system also contains purposeful errors known as "SA" or selective availability. To prevent the precision of GPS positioning from being used against the United States, a purposeful random error is introduced into the clock signal broadcast by the GPS satellites (known as selective availability or SA). This error has the effect of further degrading the accuracy of the pseudorange determinations and, hence, the accuracy of the coordinates determined for the GPS receiver. Since this error is random it can be averaged out by making positional determinations over a significant period of time. In other words, slow survey-type determinations can largely avoid this intentional error, but rapid determinations such as those need in airplane positioning or even automobile positioning are effectively impeded.

A method of improving rapid GPS position determinations in spite of SA is Differential GPS (DGPS). In this technique an additional "known" location is added to the GPS determination. Essentially, ground stations in the general vicinity of the moving GPS receiver simultaneously receive the GPS signals and determine their own positions. Since the ground stations are stationary, any change in their determined position must be due to GPS error, either natural or intentional. The delta value between the stations "true" position and the position recently determined by GPS is broadcast so that mobile GPS receivers in the area can use this correction to improve their own positioning results. Because mobile receivers in the vicinity of the ground station are "seeing" the same GPS satellites through essentially the same part of the atmosphere and at the same instant as the ground station, these differential corrections are quite effective at overcoming atmospheric effects.

However, because the mobile GPS receiver is not at exactly the same coordinates as the ground station, the correction is not perfect. An alternative way of utilizing the differential ground stations is "reverse" GPS. In a nutshell this technique requires that the positions of a network of ground stations be known. These known position data are used to continually determine the actual positions and SA+clock corrections of the satellites. These data are then broadcast to the mobile GPS receiver, which employs this improved satellite position data and SA+clock corrections along with its locally determined pseudorange data to determine its own position. It is also possible to make various combinations between the DGPS method described above and the "reverse" GPS in any attempt to overcome the various GPS errors.

STATEMENT OF THE INVENTION

The present invention provides a method and a device for producing superior differential GPS positioning data. The system includes a network of GPS receiving ground stations covering a wide area of the Earth's surface. Ideally, the network would cover the entire surface of the globe although adequate results can be obtained from only partial coverage. Unlike other differential GPS systems wherein the known position of each ground station is used to geometrically compute an ephemeris for each GPS satellite, the present system utilizes real-time computation of satellite orbits based on GPS data received from fixed ground stations.

The GPS data is used through a Kalman-type filter/smoother to adjust a real-time orbital model. The orbital calculations output periodic orbital corrections that allow the ephemerides to be known with greater accuracy than from the GPS broadcasts. The orbits are propagated ahead in time and differenced with actual pseudorange data to compute clock offsets at rapid intervals to compensate for SA clock dither.

The orbital and clock calculations are based on dual frequency GPS data to compensate for ionospheric delay. The estimated delay at each ionospheric point are used in real-time to construct and update an ionospheric shell map to total electron content which is output as part of the orbital correction data, thereby allowing single frequency users to estimate ionospheric signal delay with accuracy approaching that of dual frequency users.

BRIEF DESCRIPTION OF THE DRAWINGS

The objects and features of the present invention, which are believed to be novel, are set forth with particularity in the appended claims. The present invention, both as to its organization and manner of operation, together may best be understood by reference, may best be understood by reference to the following description, taken in connection with the accompanying drawings.

DETAILED DESCRIPTION OF THE INVENTION

Figure 1:
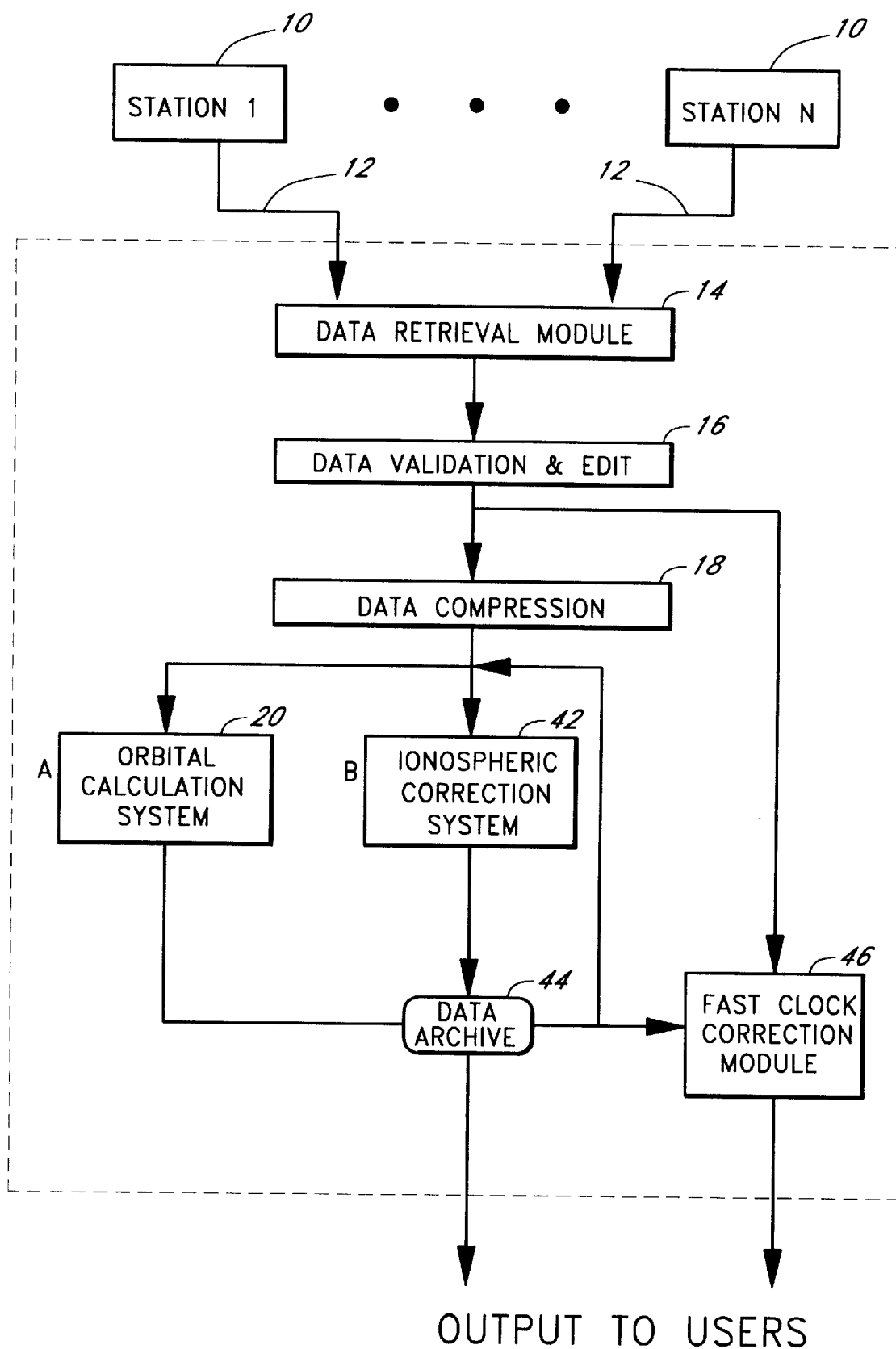
FIG. 1 shows an overall flow diagram of the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide improved wide area differential GPS positioning.

The present inventors have produced a greatly improved GPS system for overcoming the errors discussed above, as well as additional errors yet to be mentioned. The system is known as Real-Time Wide Area Differential GPS (RTWADG) because it provides superior real-time corrections allowing mobile GPS receivers to rapidly make positioning determinations of unparalleled accuracy. The method utilizes some of the approaches mentioned above, but performs superior enhanced error correction.

The RTWADG system is partially based on the paradigm of more accurately determining the satellite positions (i.e., correcting GPS errors of the second type), the same paradigm employed by "reverse" GPS. However, rather than instantaneously determining the "true" positions of the satellites based on the known positions of a network of ground stations, the current invention uses a complex orbital model to predict the orbital position of the satellites. This model contains corrections for orbit distortions caused by tidal forces, solar pressure, and other forces acting upon the satellites. However, the end result is more than a simple orbital model. Positional determinations are made by the network of ground stations as in "reverse" GPS. These data are then combined with the modeled orbital position through a Kalman-type sequential filter/smoother to generate a dynamic orbital model that combines the features of orbital mechanics and "reverse" GPS. In actual practice the satellite positions provided are significantly more accurate than the satellite positional information ordinarily supplied by the GPS system. By improving the accuracy of the satellite position information, the second type of GPS error is considerably reduced.

The same system, just described, that reduces the second type of GPS error also yields improvements for the first type of GPS errors. Recall that these errors are those that impact the measurement of apparent distance (pseudorange) between the receiver and the satellites. These errors are caused either by variations in the rate at which the signals travel from the transmitter to the receiver or by variations in the clocks used to measure the rate of signal travel. The variation of signal transmission through the ionosphere is largely corrected by use of dual frequency observables (i.e., the combination between data from carrier frequency L1 (1.2276 GHz) and L2 (1.57542 GHz).

In practice of the invention this L1/L2 corrected pseudorange is measured at one-second intervals, which results in data with a noise of more than one meter. However, carrier wave phase data is also measured at a one-second interval. This data has, as explained above, an arbitrary bias (i.e., the exact integer value of whole wavelengths is unknown), but is measured with great precision. A smoothing procedure can be employed in which the carrier phase data is used to constrain and smooth the pseudorange data so that noise is rapidly reduced to less than 10–20 cm.

Once an improved orbit model is constructed that includes the pseudorange measurements, overall corrections to the potential clock errors can also be computed. It is known that the satellite clocks are highly stable over extended period of time, although the short term clock transmissions are subject to random errors to purposefully degrade performance. The satellites report the offsets between their on-board clocks and a system-wide GPS clock which is currently available only to the military. However, it is relatively simple to equip the network of stations taking GPS data with a stable and accurate clock to provide network time. This network time exactly tracks GPS time, but there is an initially unknown offset between network time and GPS time.

When the orbital solutions are complete, the precise distance from a satellite to a receiver at a known position becomes a known quantity. The offset between the receiver station and network time is known, as well as the offset reported by the satellite between the satellite's clock and GPS time. It is possible, then, to calculate how much the satellite clock was offset from network time during the pseudorange measurement to produce the correct distance (i.e., the modeled distance). The calculated satellite clock offset includes both the artificially induced SA "clock dither" plus the much more slowly changing clock variations arising naturally from instability of the GPS satellite oscillators.

Although one could develop software to perform the orbital modeling, Kalman-type filtering, and clock corrections, a software tool which can perform this type of Kalman-type filtering and accurate dynamic modeling of GPS orbital position is already available in the form of the GIPSY-OASIS II software system developed by the Jet Propulsion Laboratory. While this software system is routinely used in a batch process rather than a real-time mode, and while it contains many functions not required by the present invention, it does represent a well-known, well-tested software device that can provide many important functions required by the present invention.

The GIPSY-OASIS-II software system is well known to those of ordinary skill in the art. This software system consists of a number of separate software modules that are linked together by the user to produce the desired results. The GIPSY-OASIS II software system will be described only briefly and in relation to its use in the present invention. For more details the reader is referred to Webb, F. H. and J. F. Zumberge, eds., An Introduction to GIPSY/OASIS-II, Jet Propulsion Laboratory, Pasadena, Calif., July 1995 (JPLD-11088), and the references therein, which is incorporated herein by reference.

Until the present invention, it had been widely assumed that the dynamic orbit determination techniques, such as those employed by GIPSY-OASIS II, are applicable only in a postprocessing mode to calculate orbits after the fact. The current inventors have found that this assumption is not correct. They have been successful in using dynamic orbit determination in a real-time process to constantly provide correction data to greatly improve the accuracy of GPS determinations.

A fundamental feature of the system is the separation of orbit and clock corrections. In actual operation the system produces a "slow" and a "fast" update or correction to GPS parameters. Since the satellite orbits and the long-term clock behavior is stable, these factors form the slow update which is broadcast every five minutes. One reason for this relatively frequent update is that it allows any newly-arrived system user to obtain full corrections within a maximum of five minutes. However, since atmospheric conditions and short-term satellite clock behavior (including SA clock dither, if present) can change rapidly, these factors are transmitted every six seconds as the fast update. The general idea is that the system provides a slowly updated orbit correction and then uses a fast pseudorange correction to remove remaining satellite clock errors.

With the system of the present invention a dynamical orbit solution may reduce the ephemeris error from about 10 m to about 30–50 cm by effectively replacing the GPS broadcast orbit. However, the fast pseudorange determination, which is made with more recent data than that which went into the orbit solutions, still contains a residual component of ephemeris error which will be partly common to users. That is, the fast correction for each satellite is obtained from the data from multiple ground stations, and thus contains a sort of average ephemeris error over the sites used to compute the correction. When applied to user data, this fast correction will scale down the new ephemeris error, but this effect is more pronounced over local areas than over wide areas.

Figure 2:
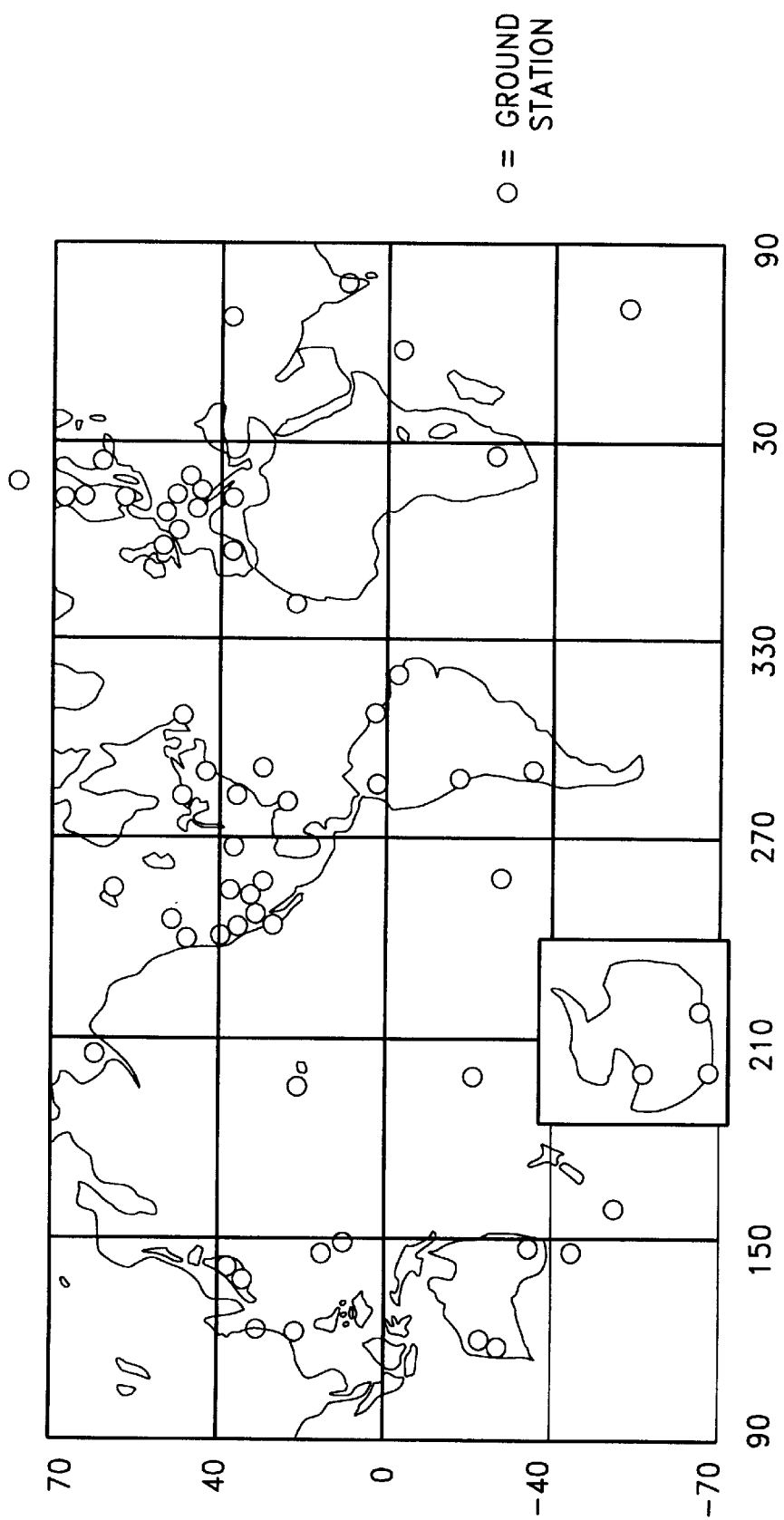
FIG. 2 is a map of the positions of ground stations used in a test of the present invention.

FIG. 1 shows an overall flow diagram of the present invention. Real-time data 12, which includes pseudorange and carrier phase data, arrives from ground stations 10 by means of special phone and data lines or by data links (i.e. by communication satellite). The number and location of the ground stations 10 influences the overall accuracy of the system as well as the geographical region over which users can obtain RTWADG correction information. FIG. 2 shows locations of currently-available ground stations that have been used to test the present invention.

The ground stations 10 continually report complete GPS data from the currently visible GPS satellites. This includes pseudorange data (one-second update) at each of the two GPS frequencies (L1 and L2), carrier phase data representing each of the two carrier frequencies (one-second update), the current ground station clock value, the satellite clock (from the received GPS data), as well as the reported satellite position and reported satellite clock offset from the master GPS clock (reported as part of a navigation message modulated on the GPS carrier frequencies). These data are received by a real-time data retrieval module 14. The data retrieval module 14 demodulates the data as necessary and arranges the incoming data into a format for further processing. The arranged data are accepted by a data validation and editing module 16.

The validation and editing module 16 detects outlier, missing and/or corrupted or clearly erroneous data and automatically excises these data from the data set. At the same time, error messages are generated to warn of possible system or component failures. The validated data are then fed to a data compression module 18. Although the orbital modeling calculations are updated at five-minute intervals, the pseudorange and carrier phase data are available at one-second intervals. As already mentioned, the phase data are used to smooth the pseudorange data in a carrier-aided smoothing or compression process in the data compression module 18 compressing five minutes' worth of data into a single data set.

Carrier-aided smoothing averages the point-by-point difference between the continuous phase measurements with their high precision and arbitrary bias and the simultaneously acquired pseudorange measurements which are noisy but unbiased, thereby smoothing down the pseudorange noise over the averaging period and producing a precise estimate of phase bias. By adding back this precise bias estimate to phase data points, it is possible to produce pseudorange measurements that are far more precise than the original data.

In a real-time application, such as the present invention, the carrier-aided smoothing is carried out recursively to maintain a running current estimate of precise pseudorange, an estimate that will improve with time as more and more points are averaged. This process is carried out according to Equation 1, wherein p(n) denotes the pseudorange measurement acquired at time n and d(n) is the delta range measurement between times n−1 and n as obtained from the continuous carrier phase. The equation, then, produces the smoothed pseudorange, P(n+1) at the time n+1:

$$P(n+1)=(n/n+1)(P(n)+d(n+1))+(1/n+1)p(n+1) \qquad (1)$$

This equation simply averages the current pseudorange value p(n+1) with the previously averaged value P(n) that has been propagated forward with the current delta range measurement d(n+1). So long as phase is continuously counted, there is no error growth from continuously propagating the current averaged pseudorange forward in this way. This smoothing can, therefore, be carried out indefinitely while continuous phase lock is maintained. (Should phase continuity be broken, the smoothing process may have to be restarted.) Note that since SA dither of the satellite clock has an identical effect on the carrier and the pseudorange, this smoothing technique does not smooth SA dither error, only measurement error. However, since the SA dither does not interfere, this technique remains the most effective way of smoothing and compressing pseudorange data.

There are several ways to employ this type of carrier-aided smoothing in real-time. For the slow update process being described here, one can replace all one-second pseudo-ranges acquired over the update interval (say, 300 measurements over five minutes) with the single smoothed pseudorange produced at the end of the interval. The smoothing operation is then restarted for the next update. This greatly reduces the data rate and the required processing time in direct proportion with no net loss of information, since the long-term correction has no high frequency components (i.e., neither orbits nor atomic clocks are expected to change rapidly), and with no loss of precision, since all acquired pseudorange measurements go into the smoothed result. Where precise higher data rates are required, as in the six-second fast update, it is possible to carry out Equation 1, but append the newly-smoothed result to phase data sampled at one-second intervals.

Since the accurate coordinate position of each ground station 10 is known (and essentially unchanging), the GPS data can be reduced to an accurate distance from the station to a given GPS satellite. Because there is an overlapping network of ground stations it is possible to calculate a coordinate position for each satellite. Of course, this position falls prone to all of the possible errors discussed above. However, the system uses a recursive smoothing and averaging system (Kalman-type filter) to eliminate noise and errors and converge on an accurate answer.

The system converges on a more and more accurate answer. These more accurate answers are updated and combined with the incoming compressed data and the resulting "improved" satellite positions are used by an orbital prediction system 20 to constantly compute, project and refine the satellite orbital positions. Any small glitches are smoothed out while the output gradually adjusts to overcome systemic biases. One of the fundamental paradigms for this process is the notion that satellite orbits cannot rapidly depart from their predicted forms. Any sudden changes are most likely to represent instrument errors or intentional satellite maneuvers, and in those instances such changes are readily detected in the affected data and wold not be used for positioning or timing calculations.

Figure 3:
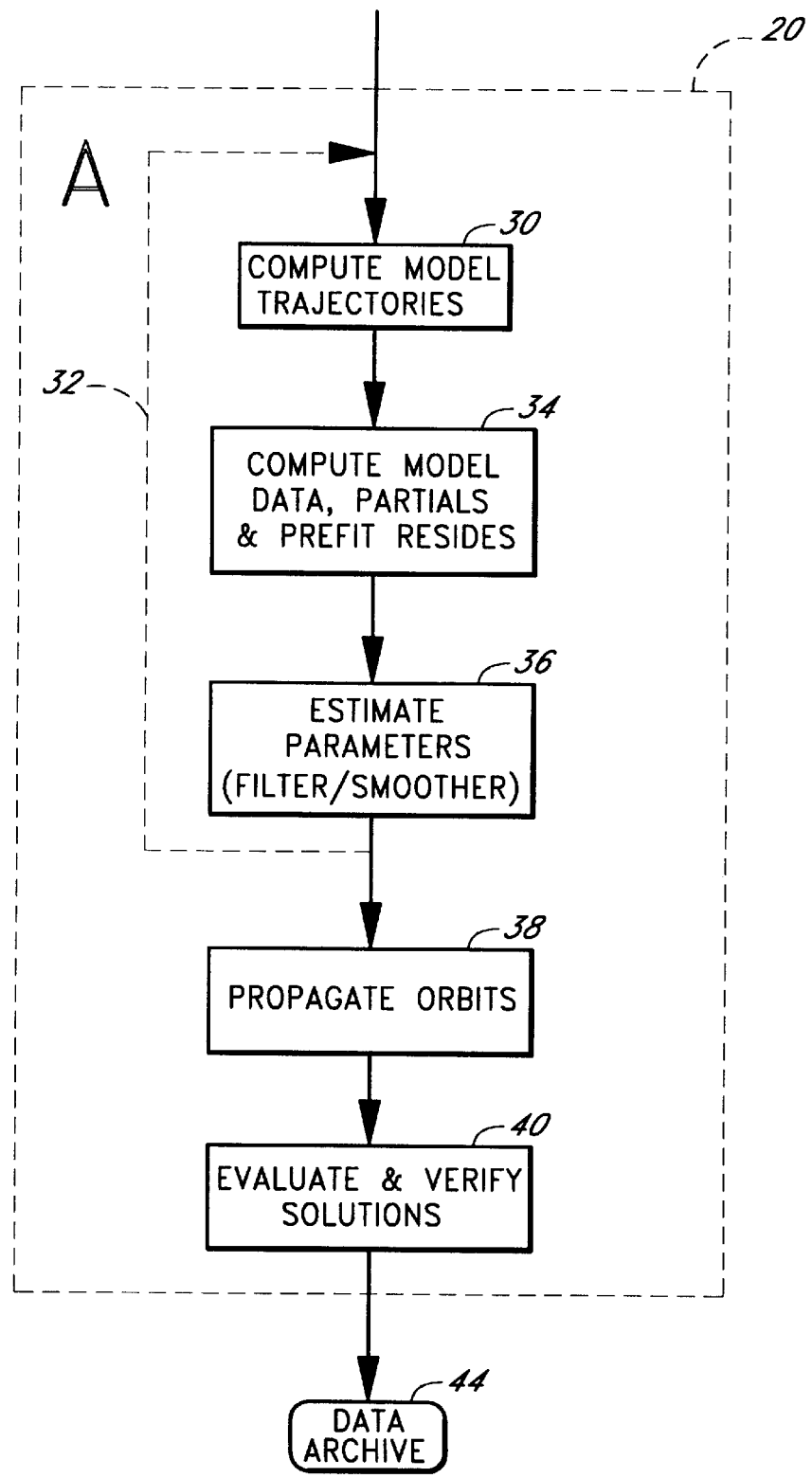
FIG. 3 shows a flow diagram of an orbital calculation system used in the present invention.

The orbital calculation system, based on the GIPSY-OASIS II software, is shown in more detail in FIG. 3. The orbital calculation system contains a complete model that covers all known significant factors that effect satellite orbit. In a trajectory module 30 initial orbital trajectories are calculated based on the new incoming positional data as conditioned by updated, smoothed positional data 32 derived from earlier orbital solutions.

The next step is the actual computation of the model orbits by a model orbit module 34. This module computes model orbits using a complete model of all the perturbing forces such as tidal influences, thermal radiation, and solar pressure. This computation of an a priori model of GPS orbits could be run prior to data collection since orbit estimation is essentially a nonlinear process that must be linearized through linear corrections applied to an accurate a priori model. Generation of the model orbits requires the computation and integration of precise models of the various forces (i.e. tidal, etc.) acting on the satellites. The resulting model orbits, together with known ground station 10 locations and other geometric measurement models and signal delay effects, permit computation of the complete a priori measurement model. This model is then differenced with the actual measurements (smoothed pseudoranges) to form the so-called prefit residuals, which are the actual observables used in a subsequent estimation step. The force and geometric models also permit computation of the matrix of partial derivatives (the coefficients of a linear regression equation) needed for the subsequent estimation.

These observables and partial differentials go into a filter/smoother module 36 for estimation of the orbits and other state parameters, which can also include adjustments to the force models. The filter/smoother module 36 employs a Kalman-type filter, which has the effect of producing a moving average in which least square estimates are used to smooth data and converge on a solution. The Kalman-type filter includes process noise models. This means that any estimated parameter can be modeled as either a deterministic or stochastic process (or as a combination of the two).

A deterministic model obeys a set functional form (e.g., a quadratic or Newtonian trajectory), of which the defining parameters may be estimated from a possibly long history of data. A stochastic model (e.g., a random walk or colored noise) accepts some degree of unpredictability (moment-to-moment randomness) in the quantity being estimated and, thus, depends more heavily on local geometric information in the data to produce an estimate. In the extreme case of a white noise model, in which the current value is assumed uncorrelated with previous or future values, only data from the current time step contributes directly to the estimate of the current value. The general formulation for all system parameters is a deterministic component with an added stochastic component, which can be set to zero.

The smoothed output of the filter/smoother module 36 comprises smoothed positional data 32 for each satellite. These data are used by an orbit mapper module 38 to propagate corrected orbits for the satellites to any desired epoch before or after the current time. The smoothed positional data 32 are also fed back to condition the new positional data arriving from the ground stations 10. This entire process is sufficiently accurate that estimates of orbits are accurate within tens of centimeters after one pass when seeded with broadcast satellite ephemerides (which are accurate only to 2 to 10 m). Additional iterations of the process may further improve this accuracy.

The corrected orbits are then routed to an evaluation/verification module 40 for testing the validity of each estimate and for discarding or warning of any anomalous results. The most direct way to perform pretransmission verifications (of any parameters output by the system) is to operate a parallel analysis system employing an entirely independent data set. That is, an additional network of ground stations can provide data which is processed as described above. Data products from the two parallel operations will be available essentially simultaneously so that the subsequent process of comparing these results and generating warning messages when the data do not agree can take place with little loss of time. Additional posttransmission verification can be accomplished by operating several additional single (i.e., not part of a network) receivers at known locations. These receivers act as ordinary system users, but their locations are fixed so that any anomalous system-produced positional information can be rapidly detected and isolated. If some of these are calibrated dual-frequency receivers, it will be possible also to verify any modeling of the ionospheric transmission delay, since the receivers can directly observe the ionospheric delay.

After evaluation and verification the slow orbital and clock corrections are stored in a data archive 44 and output to the users as a series of delta corrections to the various satellite ephemerides and clock offsets. The user, generally in a moving vehicle or aircraft, takes the corrections (along with fast clock correction discussed below) provided by the nearest ground stations 10 and uses them to correct the navigation information supplied by the GPS satellites, thereby overcoming many of the errors present in the usual GPS system. The slow corrections are derived from the absolute three-dimensional error of the estimated ephemeris, which, in turn, is affected by measurement errors (receiver noise and multipath), receiver location errors, residual atmospheric delay errors in the data, as well as satellite dynamic modeling errors. Atmospheric delay errors can contribute to the user's error in two ways: uncompensated delay will cause a direct error in the user measurement; and delay will contribute to errors in the ground station GPS data and, thus, to the computed fast and slow corrections. Receiver location errors will be only a centimeter or so and can be ignored. Moreover, the optimized orbit estimation technique will eliminate small stochastic corrections to both the zenith atmospheric delay and to the satellite forces. This will have the tendency of absorbing the effects of unmodeled errors in these parameters.

The slow update orbital and clock corrections do not give good results in actual use situations because the satellite clocks are subject to purposeful degradation (SA). Therefore, a fast clock correction update (every six seconds) is provided to overcome rapid clock fluctuations. The fast clock correction module 46 operates by comparing predicted pseudorange with actual measured pseudorange. As mentioned previously, the orbital solutions are very stable and can accurately be propagated forward in time for at least several hours. Every six seconds the orbital position is propagated forward from the latest slow (five minute) update, and the distance from a given ground station 10 to a given GPS satellite is calculated. This is actually done slightly ahead of real-time so that the distance will be available when the most recent pseudorange data arrives from that ground station 10. Furthermore, to take full advantage of the incoming, one-second interval data the orbital position predictions can also be computed at one-second intervals.

There are at least two alternative methods for computing the fast clock correction. Ordinarily, the predicted orbits and receiver clock error combined will contribute a positioning error of less than one meter to the predicted pseudorange. It is only the estimate of the satellite clocks, subject to SA dither, that can contribute a significant positioning error. The simplest way of reducing this error is to subtract the measured and predicted pseudoranges and output this difference as a fast error correction for the users.

An alternative, and presently preferred embodiment, employs a more sophisticated strategy. This involves fixing the orbits at their predicted values and then simultaneously solving for all the network and satellite clock offsets at each one-second data step using combined network data. This is no longer a matter of simple differencing, but requires the solution of a set of linear equations. Data from only a subset of receivers is needed for each satellite clock solution because satellite clock offsets, not ground clock offsets, are the objective. The process simply eliminates ground clocks as a source of error in generating the fast corrections. Thus, any ground clock prediction error is eliminated, and with it any strict requirement on ground clock stability except for those sites that are defining Network Time. This also eliminates vulnerability to ground clock anomalies which are isolated by this process so they may be detected instantly.

Fast corrections, according to either embodiment, are strictly valid only at the precise time of data acquisition, which of course precedes their interval of use. Because of SA dither the fast corrections will become increasingly in error over the interval between fast correction updates—perhaps by as much as several meters. However, examination of the power spectrum of SA dither has demonstrated that a simple quadratic predictor of SA error will be adequately accurate over the six-second use interval. Thus, the fast correction is also adjusted with a quadratic predictor based on a fit to at least the latest six one-second data points and projected forward to the midpoint of the expected use interval. This should reduce the SA dither error to about a decimeter.

Carrier-aided smoothing, mentioned above, of the one-second data points contributes to accuracy of the fast correction. However, the method is applied somewhat differently here. Instead of using the carrier phase to smooth the pseudorange over an update interval as with the orbital prediction, pseudorange is used to improve knowledge of the carrier phase bias. The phase bias estimate is updated with the current pseudorange measurement every second, thereby averaging the current phase-pseudorange difference in with previous difference. The resulting phase data will show somewhat greater point-to-point scatter than if the bias were held fixed for a period of time. Once, however, the phase bias is fixed, the full precision of carrier phase can be exploited. The strategy is to use a smoothing process that refines the phase bias estimate with pseudorange data, but does so in steps of six seconds with a lag of several steps behind real-time. The common phase bias for the current phase data is held fixed over the lag interval, allowing the phase data to be treated as pseudorange data (i.e., used in place of) in computing the fast correction. When fitting to the one-second fast corrections to project (i.e., predict) SA dither ahead in time, maximum advantage can be taken of the extreme precision of carrier phase.

Recall that the pseudorange data used for the orbital predictions consists of L1 and L2 dual frequency data so as to correct ionospheric delay. However, many users of the RTWADG system have receivers that work with only one of the two carrier frequencies because such receivers are lighter, smaller, and less expensive. When single frequency users attempt to employ correction data derived from dual frequency data, they obtain pseudorange data that is distorted by an interfrequency bias in the transmitter, a bias that is absorbed into the fast and slow corrections for the dual frequency user.

An accurate model of ionospheric delay is needed to correct the biases observed by single frequency users. Once an ionospheric model is adopted there are several ways to apply the model results. One could use only a single frequency (L1) to compute the fast correction, after first applying a correction derived from an ionospheric model to that data. This, however, would degrade the fast correction and leave the dual frequency users with a net bias. The ionospheric model results could be used to adjust the fast corrections to values that are correct for the single frequency users. This, however, would still leave an uncorrected bias for the dual frequency users. A better solution could be to broadcast the modeled L1/L2 biases so that the users could either apply them or subtract them (depending on whether the biases had already been applied to the fast corrections). This would compromise neither the single nor the dual frequency users.

Figure 4:
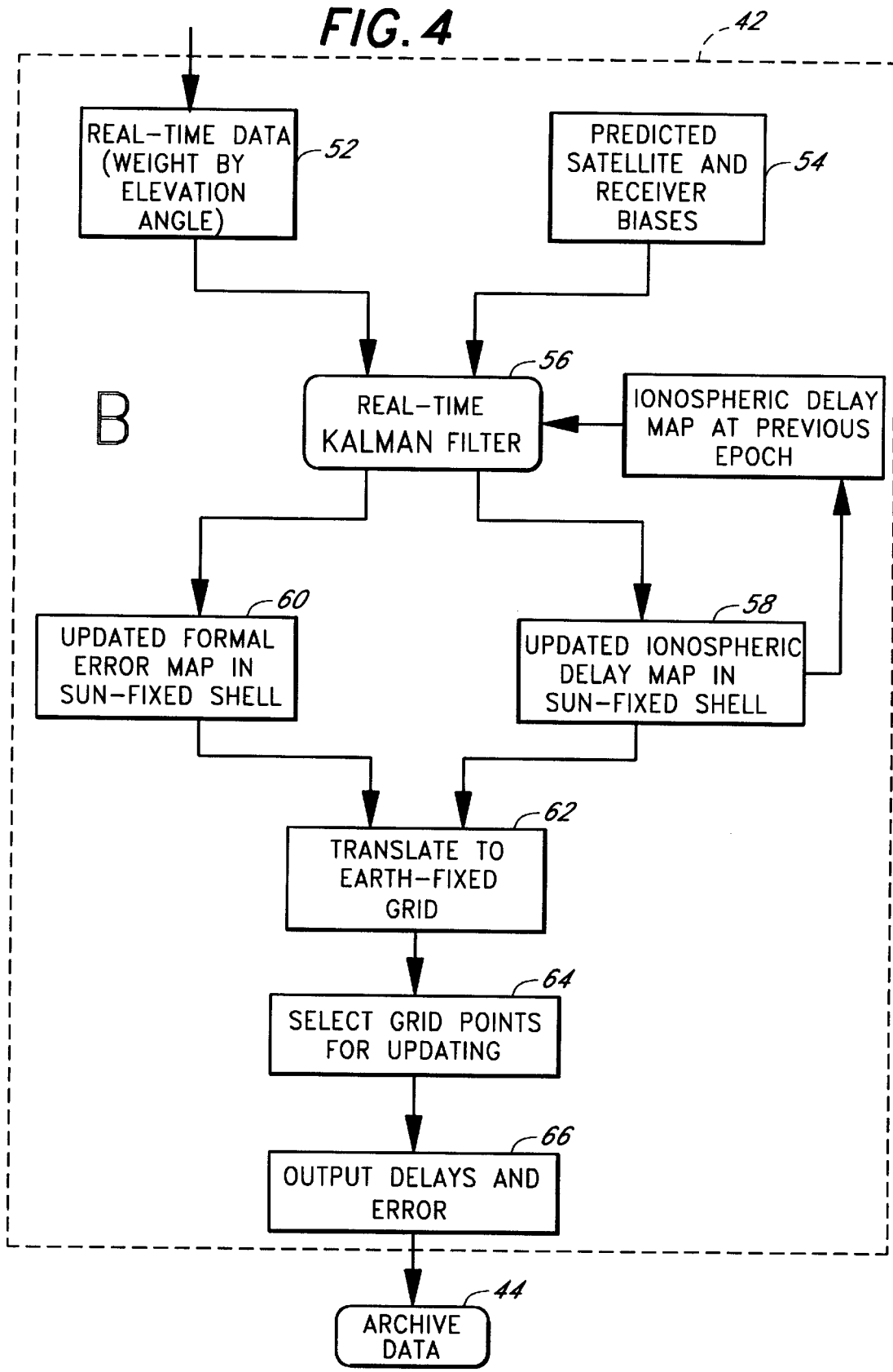
FIG. 4 shows a flow diagram of an ionosphere correction system used in the present invention.

An ionosphere correction system 42 in FIG. 1 is shown as a more detailed flowchart in FIG. 4. The heart of this method is a model of the ionosphere. In one embodiment ionospheric delay is assumed to be due to a thin shell of electron density concentrated at about 350 km above the Earth's surface. The signal delay of this shell is parameterized in terms of a set of vertex values uniformly distributed in a triangular pattern over a spherical surface. Considerable detail concerning this type of ionospheric model is explained in "A New Method for Monitoring the Earth's Ionospheric Total Electron Content Using the GPS Global Network," Mannucci, A. J., Wilson, B. D., and C. D. Edwards, presented at ION GPS-93, Salt Lake City, Utah, Sep. 22–24, 1993, included herein by reference.

Since the ionosphere is strongly influenced by solar radiation, the modeled spherical surface is Sun-fixed so that the grid does not rotate with respect to the basic structure of the ionosphere. The use of a shell model and bilinear surface interpolation makes this method for calculating ionospheric delay especially suitable for wide area corrections since it uses a set of grid locations which are uniform over the spherical surface, while other systems use a rectangular grid which is nonuniform when mapped onto a sphere.

Each ionospheric measurement (i.e., the difference between the L1 and the L2 carrier delay, with the level adjusted to match the pseudorange, P2–P1) from the ground stations 10 can be modeled as a simple linear combination of the vertex parameters as shown in Equation 2.

$$I_{rs}(t) = F \sum_{i=1}^{3} W_i(\phi_{pp}, \lambda_{pp}) V_i + b_r + b_s \qquad (2)$$

$I_{rs}(t)$ represents the real-time ionospheric measurement in the direction of satellite s by receiver r at time t. $V_i$ is the value of TEC (total electron content) at vertex I, while F is the obliquity factor relating slant delay to vertical delay. The factor $W_i(\phi_{pp}, \lambda_{pp})$ is a geometrical weighting factor which relates the TEC at the ionosphere pierce point location $(\phi_{pp}, \lambda_{pp})$ to the TEC at the three vertices of the grid triangle containing the pierce point location. The relationship between the pierce point and its related vertices (i.e., the vertices of the triangle through which the signal passes) is based on a simple bilinear interpolation scheme. Using this model, the Kalman-type filter/smoother estimates the vertex parameters $V_i$ from the real-time L1/L2 data. The final two terms, $b_r$ and $b_s$, represent the instrumental L1/L2 biases in the receiver and satellite transmitter, respectively. Since these terms affect the measured delay, they must be included in the model.

The current inventors have found that improved results can be achieved by a second embodiment of the ionospheric model wherein the ionosphere is not modeled as a shell, but as a three-dimensional electron density profile (i.e., the density of electrons varies with altitude). The model incorporates a number of a priori electron density profiles. The actual measurements are then used to scale these profiles to best fit the data. For the three-dimensional approach Equation 2 is generalized as follows. Instead of assigning a vertical TEC at each vertex ($V_i$), we assume each vertex has an electron density profile ($N_i(r)$) associated with it, where r is the radius from the Earth's center. These profiles can be obtained from ionospheric models, such as Bent, IRI-90 or PIM (parameterized ionospheric model) all of which are well known to those of ordinary skill in the art.

Using the same weighting function $W_i(\phi, \lambda)$ to interpolate electron density rather than TEC, one can define an electron density function $N_e(r, \phi, \lambda)$ which specifies electron density as a function of radius from the Earth's center, as well latitude and longitude. This density function is defined as follows:

$$N_e(r, \phi, \lambda) = \sum_{i=1}^{3} W_i(\phi, \lambda) N_i(r) \qquad (3)$$

The sum is over the three vertices that enclose the point $(r, \phi, \lambda)$.

Using this three-dimensional model for the electron density, one can derive a more general form of Equation 2 which permits the accurate modeling of the observed TEC as an integrated density:

$$I_{rs}(t) = \int_{r=R_E}^{r=20{,}000 \text{ km}} N_e(r, \phi, \lambda) ds + b_r + b_s \qquad (4)$$

where $R_E$ is the radius of the Earth. The integral is along a line of sight between a GPS satellite and receiver whose differential element is ds. By using Equation 4 and interchanging the order of summation and differentiation one can obtain:

$$I_{rs}(t) = \sum_{\text{all intersected tiles}} \int_{r=R_E}^{r=20{,}000 \text{ km}} W_i(\phi, \lambda) N_i(r) ds\, tb_r tb_s \qquad (5)$$

If each vertex density Ni(r) is written as the product of a scaling factor $\alpha_i$ and a normalized density $\tilde{N}_i(r)$ [$\int \tilde{N}_i(r)dr=1$, where the integration is along the radial line through the vertex], we obtain:

$$I_{rs}(t) = \sum_{\text{all intersected tiles}} \alpha_i \int W_i \tilde{N}_i ds + b_r + b_s \qquad (6)$$

In this case, the ($\alpha_i$) scaling factors are estimated by the Kalman-type filter/smoother, along with the br, $bs_x$ biases. Note that no elevation scaling function (F in Equation 2) is used.

Real-time compressed data from the data compression module 18 is processed by a data weighting module 52 where the data is weighted according to the elevation angle of the GPS satellite versus the receiving antenna of the ground station 10. Data from lower elevation angles are noisier and will tend to produce a larger formal error; therefore, weighting is used to reduce the contribution of this poorer quality data. At the same time, data representing the predicted instrument L1/L2 biases is introduced from a bias module 54. These bias predictions are obtained "off-line" by the ionospheric correction software operating on the previous day's data or from a separate measurement of the bias.

The real-time data and bias predictions are processed by a real-time Kalman-type filter/smoother 56 which is very similar to the filter/smoother 36 used in the orbital prediction system 20. Filtering is a recursive estimation process in which a previously estimated ionospheric delay map is incrementally adjusted with new data, nominally every five minutes, to coincide with the slow orbit correction update. The filtering process is initialized with the Bent ionospheric model (other appropriate models can be substituted) so that when it first starts up adjustments are made to a priori reasonable data rather than to arbitrary zero values. After a few update intervals, the actual data will fully determine the maps with no further dependence on the a priori model. The estimation process by the Kalman-type filter/smoother module 56 makes extensive use of the stochastic estimation features that have already been discussed in reference to the filter/smoother module 36. At each update, the zenith ionospheric delay at every point on the dense triangular grid is reestimated. To improve stability and accuracy of the estimates, the values at each vertex are modeled as stochastic processes with a suitable time correlation (i.e., they are not estimated independently at each step; instead a brief history of previous measurements contributes to the current estimate). The values of adjacent grid points are spatially correlated through bilinear interpolation, resulting in accurate, stable and smoothly varying ionospheric maps.

One problem with bilinear interpolation is that the ionospheric maps may show artifactual "corners," that is, discontinuous surface derivatives related to the existence of the triangular grid. The inventors have discovered that this problem can be ameliorated by applying a set of functions having continuous second order derivatives ("$C^2$" continuity) to produce a significantly smoother ionospheric map. The $C^2$ approach does not explicitly use a grid. Rather, it relies on a set of basis functions-bicubic spline functions, that have been specially formulated to cover a sphere without singularities (such singularities occur when functions intended to cover a planar surface are straightforwardly applied to a spherical surface). However, these basis functions are centered on a grid of "nodal points" that cover the sphere. Each function is nonzero over a limited portion of the sphere, which is approximately the same area of coverage for each function.

Figure 8:
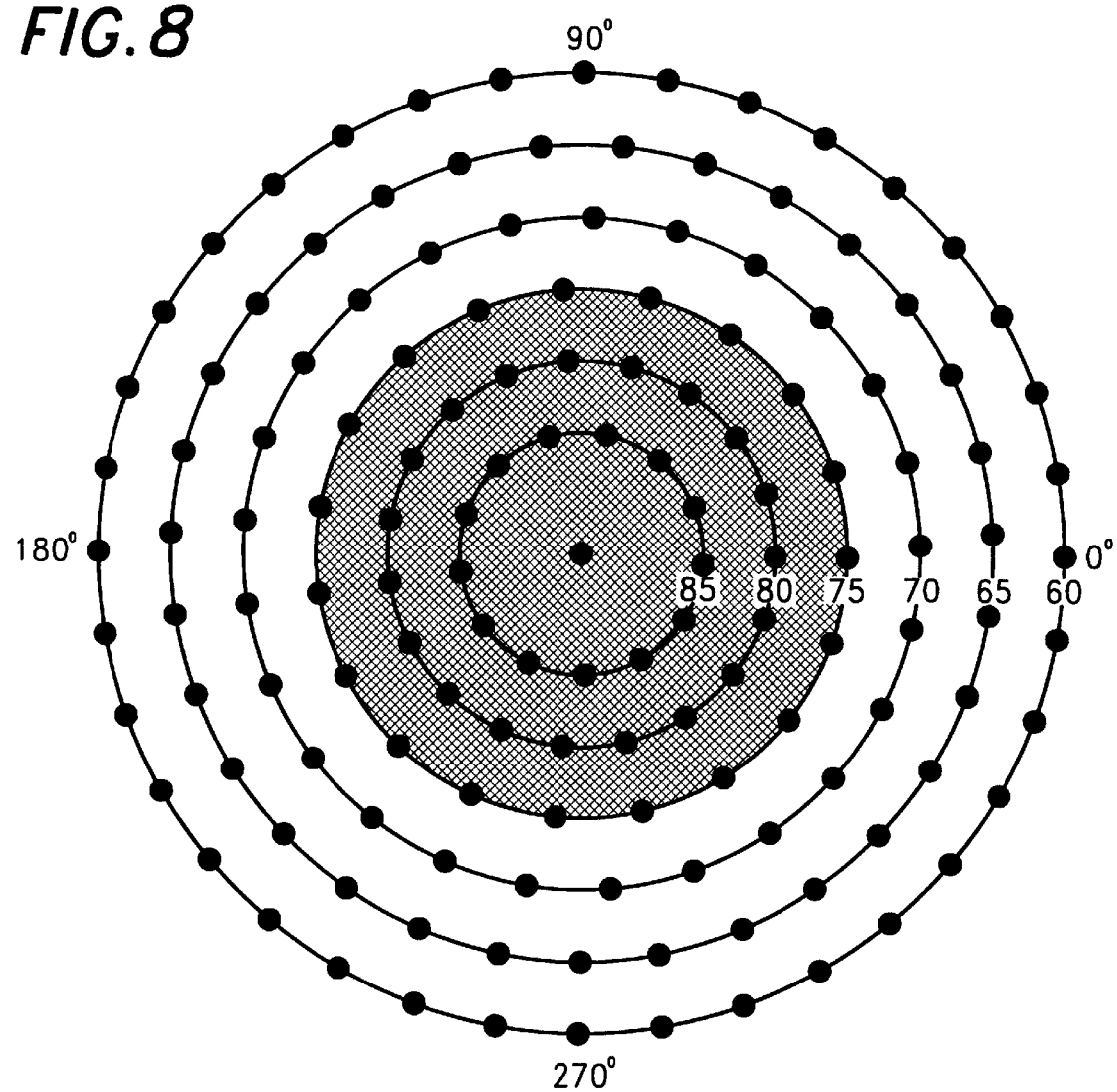
FIG. 8 shows a polar coordinate map used in one embodiment of the ionospheric mapping of the present invention.
Figure 9:
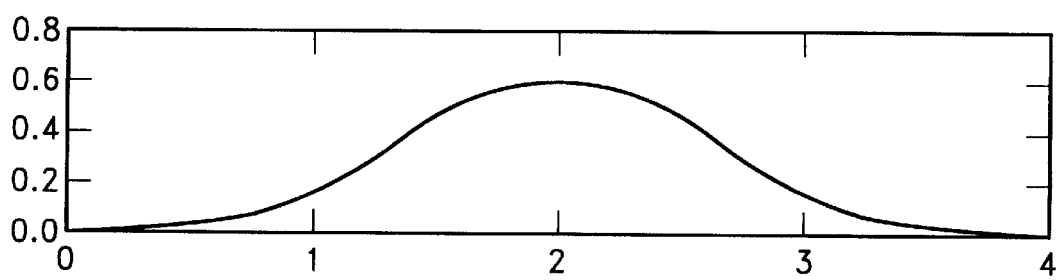
FIG. 9 shows an illustration of a basis function used in one embodiment of the ionospheric mapping of the present invention.

FIG. 9 shows a standard $C^2$ basis function graphically. The x axis is in units of the longitudinal distance between the nodal points. The y axis shows the actual value of the function. FIG. 8 shows the distribution of nodal points for a configuration where there are five "rings" per 90 degrees of latitude (different schemes of nodal point spacing are possible). The plot in FIG. 8 is a polar coordinate plot with the shaded area showing the "support region" (the region where the function is nonzero) for the polar basis function.

For the $C^2$ approach Equation 2 becomes:

$$I_{rs}(t) = F \sum_{\text{all nonzero functions}} V_i b_i(\phi_{pp}, \lambda_{pp}) + b_r + b_s \tag{7}$$

where $b_i(\phi,\lambda)$ is a basis function that is nonzero at the $I_{pp}(\phi_{pp},\lambda_{pp})$. In this case, the Kalman-type filter/smoother is used to estimate the basis function coefficient $V_i$.

Figure 5:
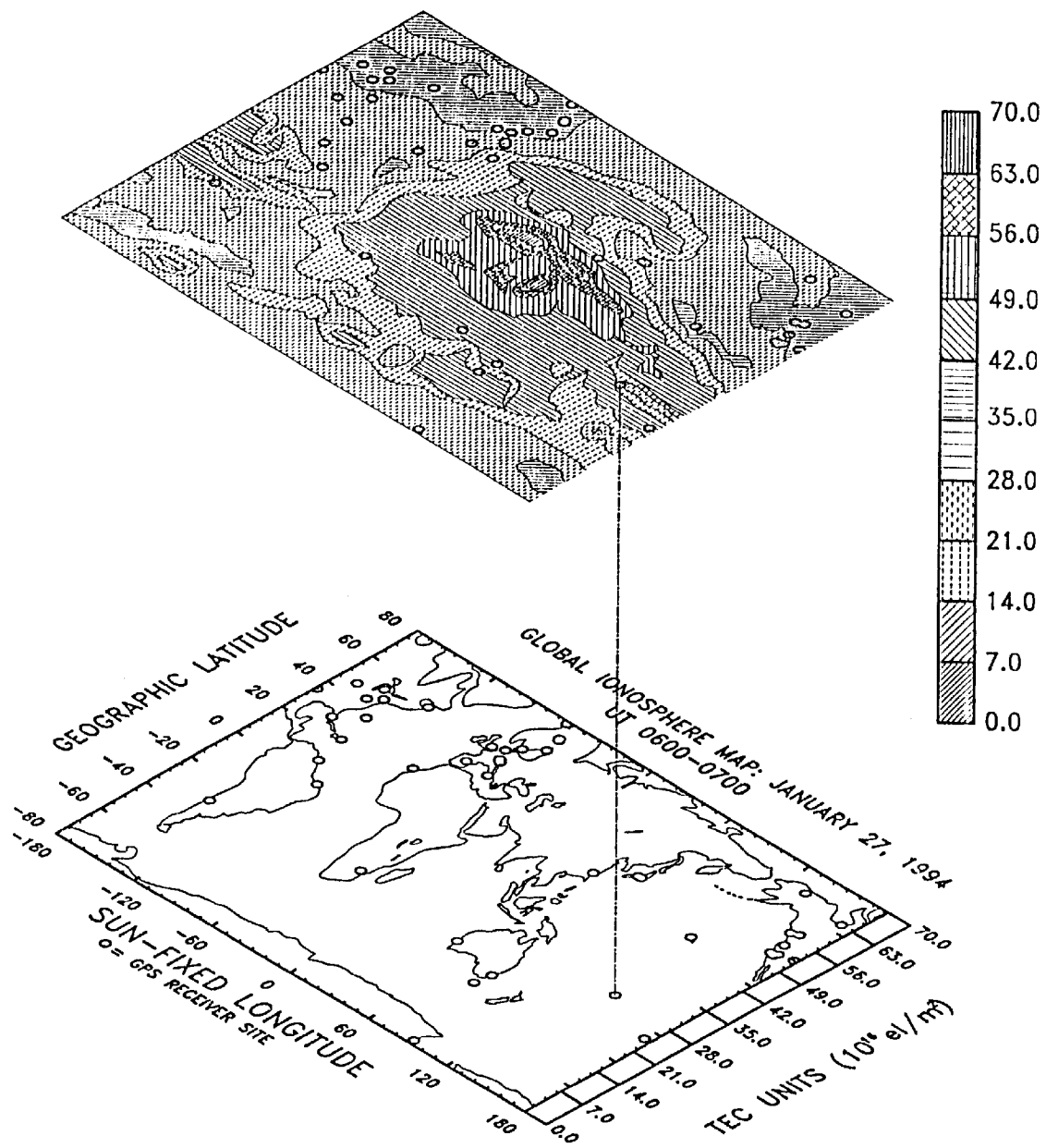
FIG. 5 shows an ionospheric delay map produced by the present invention.
Figure 6A:
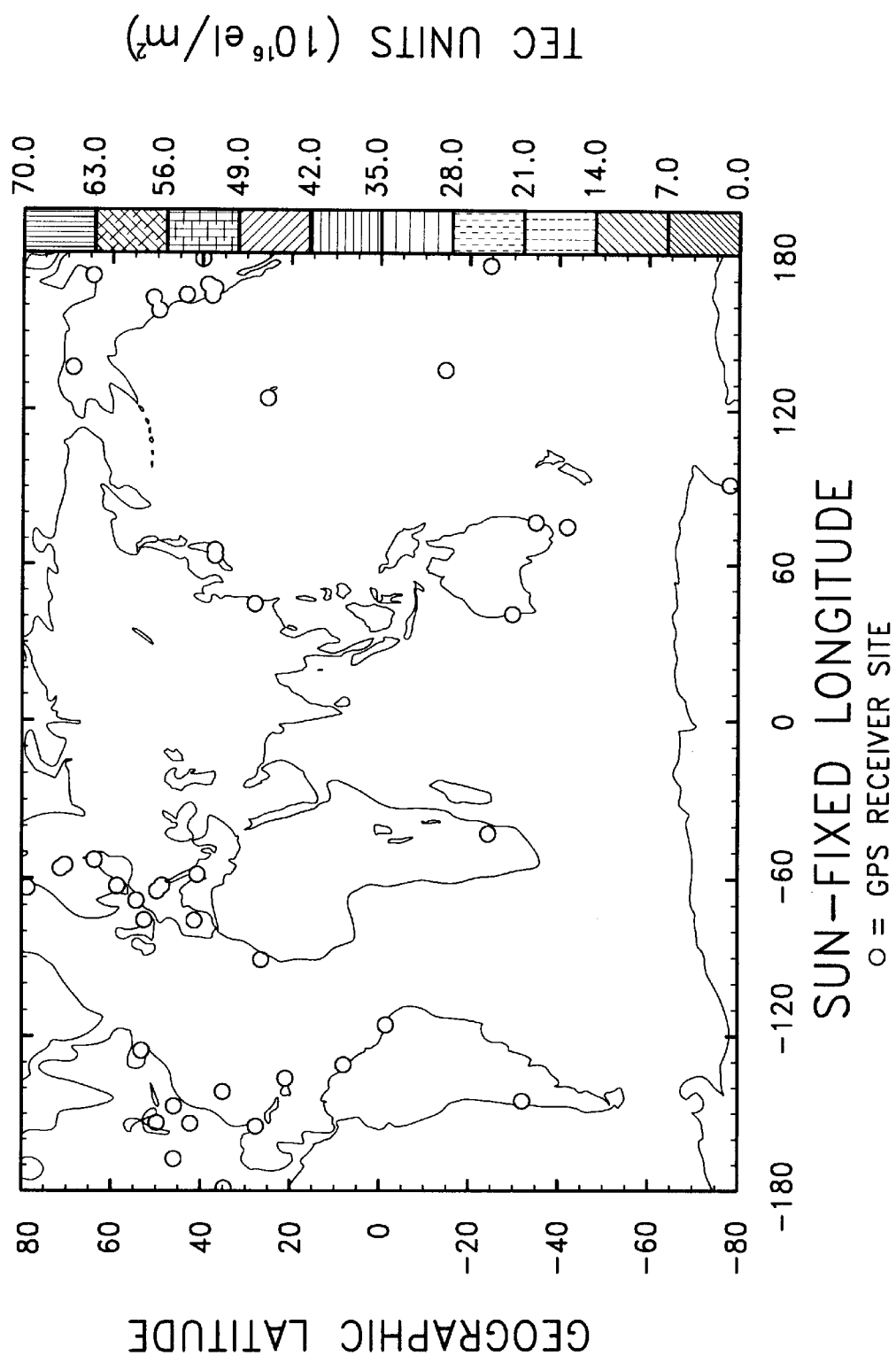
FIG. 6a shows a detail of an underlying global map used in FIG. 5.
Figure 6B:
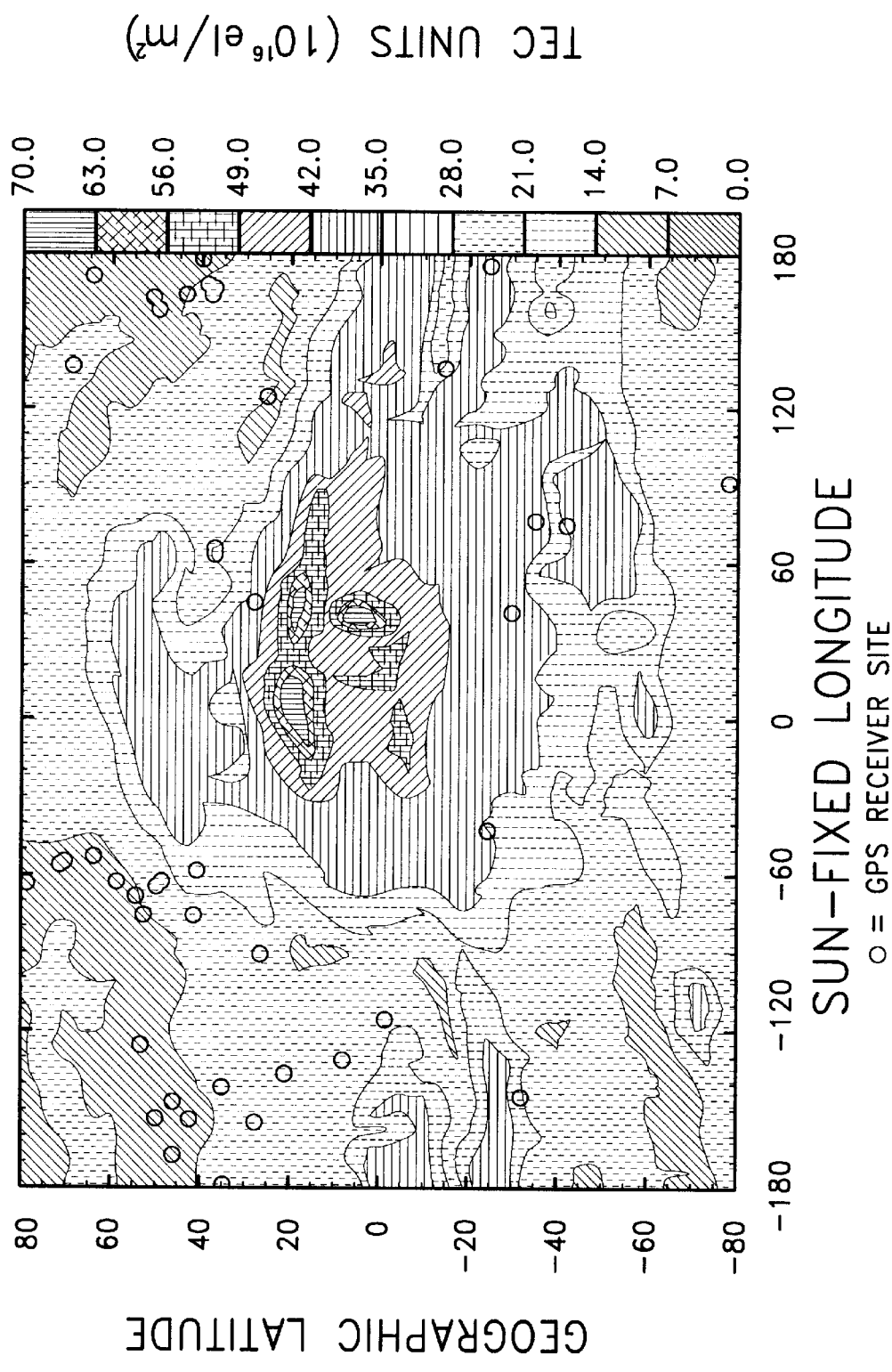
FIG. 6b shows a detail to a total electron content map used in FIG. 5.

Data from the Kalman-type filter/smoother 56 are used by a delay map module 58 to produce an updated delay map similar to the one shown in FIG. 5, which represents a "snap shot" of a one-hour time period on Jan. 27, 1994. In FIG. 5 a map of TEC regions in the ionosphere (see detail in FIG. 6b) is superimposed over a global map (see detail in FIG. 6b), where circles indicate the ground stations 10 used to prepare the map). Extensive evaluations have shown that maps of this type are accurate to better than one meter of L1 delay (for atmospheric regions over oceans between 30–60 degrees North latitude). At the same time a formal error map module 60 stores an estimation of errors at each vertex for use by the next iteration of the Kalman-type filter/smoother 56. The formal error map is also used to evaluate the quality of the corrections broadcast to the user. The formal error map can be used to block the broadcast of suspect data and can be used by the user to make error estimates of the accuracy of his determined position.

An Earth-fixed grid module 62 uses a simple bilinear interpolation scheme to translate the updated ionosphere delay map to Earth-fixed grid coordinates. A grid point selection module 64 compares the updated maps vertex-by-vertex with an average of the prior set of values to select which of the vertices should be output to the users. Finally, an delay output module 66 formats the selected vertices for output to the users.

A key aspect of the present invention is that the system be capable of real-time data processing so that the users can receive constantly updated positional corrections. This is especially critical for the fast clock corrections, since SA dither can cause rapid changes in satellite clock parameters. Therefore, it is important to verify that the computations of the present invention do not take more time than the update intervals. There are three key processes to evaluate in terms of CPU time: orbit integration, slow correction filtering, and fast pseudorange correction (fast correction update). All test runs intended to verify CPU time were run on an HP 9000/735 workstation at a clock rate of 99 MHZ. This is a fairly current RISC microprocessor and represents readily available hardware.

Orbit integration is a process necessary for the dynamical orbit approach to computing the slow orbit corrections. To estimate the CPU time required to propagate the orbit for 5 minutes, a single satellite was integrated for approximately 21 hours, with a resulting CPU time of 4.56 seconds. This would yield a CPU time of approximately 0.44 seconds to integrate all 24 GPS for five minutes. This integration represents the most faithful dynamical model currently in use including a solar pressure model, gravitational perturbations due to the Sun and Moon, as well as solid and liquid tidal forces. In addition to integrating the state forward in time, the program computed the variational partials of the current state, three solar pressure parameters and a yaw rate parameter with respect to the epoch state. Many of these additional factors could be eliminated, further cutting the computational time.

The second part of the slow correction is the Kalman-type filter/smoother execution time. When processing pseudorange data only, execution time is quite fast because there are no phase biases to estimate. The total number of estimates in the slow orbit correction is as follows: 9 parameters for each of 27 satellites (24 GPS and 3 GEO satellites) and 2 parameters for each of 24 ground receiver for a total 291 parameters. This comes out to approximately 1.9 seconds for each full slow correction (five minute) update. If the number of ground stations or parameters is significantly altered, the execution time will change; however, it is clear that there is plenty of room for expansion between 1.9 seconds and 5 minutes.

The two alternative methods for calculating the fast clock correction have different execution times. The second method (simultaneous solution of all the clocks) is more time consuming. However, the number of parameters in the fast correction is fewer than 48 since at any time the system will be dealing with fewer than 24 GPS satellites and fewer than 24 ground receiver stations. The actual number of measurements is fewer than 12×24 if each receiver has 12 channels. Thus, the actual execution time for the fast update is less than $(2 \times 12 \times 24 \times 48^2)/(26 \times 10^6 \text{ sec})$, or about 50 msec for each 1-sec update. This estimate is based on execution requirement of 26 Mflop (or 26 million floating point instructions) for the inner loops of the Householder transformation required for the calculation. This execution is proportional to the number of measurements times the square of the number of estimated parameters. Even an expanded network of ground stations 10 would yield a fast correction execution time of less than 0.2 sec.

Table 1 summarizes the estimated execution times. One should keep in mind that only the time needed to compute the fast correction (<50 msec. for 24 ground stations) contributes to the latency of the fast correction. All other steps are completed before the arrival of the data used to generate the fast corrections.

TABLE 1

Execution Times for Key WAAS Tasks, HP 9000/735

| Task | Execution Time |
| --- | --- |
| Integrate 24 Orbits for 5 min; Compute predicted pseudoranges | <0.5 sec |
| Slow 5-min Orbit Corrections (pseudorange only) | <1.9 sec |
| Slow 5-min Orbit Corrections (pseudorange and phase) | <20 sec |
| 1-sec Fast Pseudorange Correction (carrier smoothed pseudorange) | <50 msec |

The inventors have tested their invention using real data taken at a 1-second rate from a limited network of ground stations (WAAS) to evaluate the fast correction portion of the invention and data taken at a 30-second rate from the NASA GPS network (see FIG. 2) to evaluate errors in the slow orbit corrections according to the present invention.

The results demonstrated that: (1) the error due to SA dither after linear extrapolation six seconds in advance was only about 9 cm when carrier-aided phase smoothing was applied and about 90 cm without the phase data; (2) quadratic predictors further improved the SA dither prediction by a factor of two; (3) dynamical orbit errors over continental U.S. and Hawaii were approximately 1 m after five minutes extrapolation beyond the fitting arc, using pseudorange data only from sites in the continental U.S. and Canada; (4) the addition of carrier-aided smoothing reduces the orbit error by a factor of two; and (5) with the same data set geometrical orbit estimation (i.e., "reverse" GPS) produced along track errors of about 3.5 m.

TABLE 2

Extrapolated SA Clock Errors

| Extrapolation | Data | No. Pts | Mean (cm) | Std. Dev. (cm) | Min (cm) | Max (cm) |
|---|---|---|---|---|---|---|
| Linear | R | 21396 | −0.54 | 90.1 | −935.7 | 1441.7 |
| Linear | R/φ | 21396 | 0.01 | 8.7 | −57.6 | 51.8 |
| Quadratic | R | 21396 | −0.01 | 54.4 | −632.3 | 575.5 |
| Quadratic | R/φ | 21396 | 0.01 | 4.3 | −24.4 | 25.7 |

Table 2 shows the results of using extrapolation strategies on one-second rate data as a means to overcome SA dither (i.e., this tests the fast correction portion of the present invention). R data represents pseudorange only data, while R/φ represents pseudorange data with carrier-aided smoothing. The pseudorange only data are excessively noisy, as is shown by their unacceptably large standard deviation; the carrier-aided smoothing data show much less noise and acceptably small standard deviations. The best method to overcome SA dither was to employ carrier-aided smoothing data with a quadratic predictor.

TABLE 3

Extrapolated Dynamical Orbit Errors

| Extrapolation Time (min) | Data Types | RMS Weighting | Radial (cm) | Cross Track (cm) | Along Track (cm) |
|---|---|---|---|---|---|
| 5 | R | WAAS | 71 | 55 | 105 |
| 5 | R | Global | 205 | 226 | 525 |
| 5 | R/φ | WAAS | 39 | 41 | 57 |
| 5 | R/φ | Global | 168 | 193 | 480 |

TABLE 4

Geometrical Orbit Errors, No Extrapolation

| Extrapolation Time (min) | Data Types | RMS Weighting | Radial (cm) | Cross Track (cm) | Along Track (cm) |
|---|---|---|---|---|---|
| 0 | R | WAAS | 790 | 265 | 344 |

To test the accuracy of slow orbit corrections a test wide area GPS network of ground stations was created from 18 sites in Hawaii, Alaska, continental U.S., and Canada. All sites acquired data at a 30-second rate. The ionosphere-free pseudorange data (i.e., a linear combination of L1 and L2 to remove ionospheric delay) was smoothed with ionosphere-free carrier phase data (sampled at a five-minute rate) to a five-minute rate. To simulate real-time filtering after convergence at steady state, the Kalman-type filter/smoother was initialized with the truth orbit and an a priori constraint of 2 m was applied in each component. The truth orbits were determined with 30 hours of phase and pseudorange data from the NASA worldwide network (FIG. 2) giving orbits that have an accuracy of about 30 cm three-dimensional RMS. The data were processed in the forward direction only with no backwards smoothing, estimating the current states at each five-minute step and propagating that state five minutes ahead for comparison with the truth orbits.

Table 3 shows the results of the dynamically determined orbit process. Again, either pseudoranges (R) or pseudoranges with carrier-aided smoothing (R/φ) are listed. The orbital errors are RMS weighted either for the area covered by the ground stations (WAAS) or for the entire Earth (global). Because the orbits are dynamical they can be propagated over regions or the globe having no ground stations, albeit with some loss of accuracy. The carrier-aided smoothing considerably reduced the orbital errors. These results should be compared with Table 4, which shows a geometrical solution over the area of the ground stations. Here the orbit error is in the same neighborhood as that of the total global orbit estimate using the dynamical orbit estimator.

Figure 7:
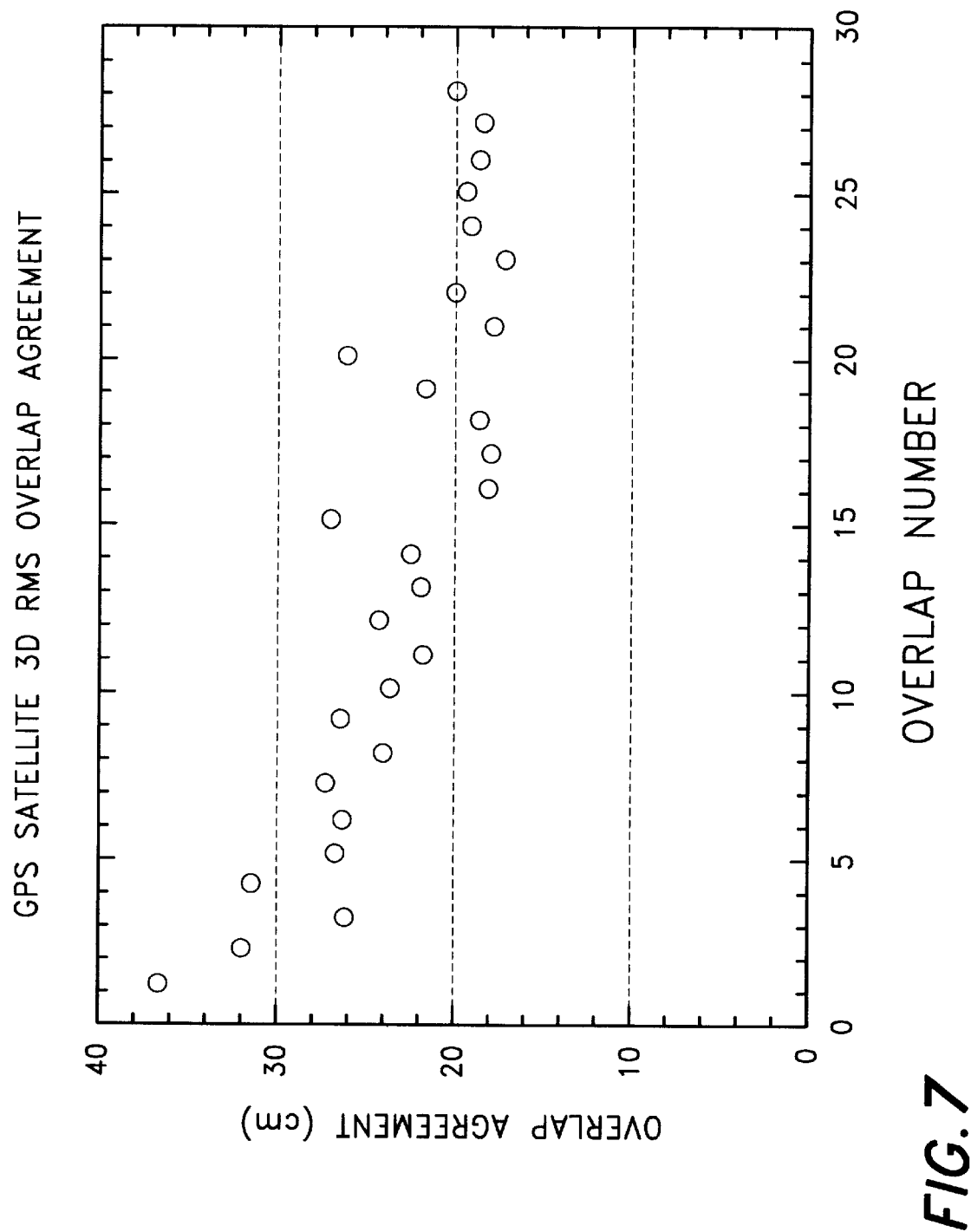
FIG. 7 illustrates the overlap of successive satellite orbits calculated by the present invention.

FIG. 7 shows the overlap of 30 successive satellite orbits during a test of the present invention. Initially, the first couple of passes agreed with each other to about 40 cm. As more orbits accumulated the Kalman-type filter/smoother had more historical data to work with and the match between successive orbits improved. After 30 iterations the successive orbits matched by about 20 cm which is a good measurement of the inherent noise and error of the system of the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. A method for providing real-time, wide area differential GPS signals to allow users with a GPS receiver to obtain improved GPS positioning, the method of comprising the steps of:

collecting real-time dual frequency GPS signals from a network of stationary receiving stations;

compressing and accumulating the GPS signals so that data received over a predetermined slow time period forms one data point from each receiving station, the data points from the entire network forming a data set;

periodically producing and outputting a slow correction once each slow time period by processing the data sets with a dynamical orbit predictor to produce calculated GPS satellite orbits in a real-time mode so that the processing steps occur in a time period less than the slow time period, the producing and outputting comprising the steps of:

conditioning the data set with updated estimates GPS parameters from processing data sets of previous slow time periods;

using the conditioned data sets to compute model orbital trajectories;

introducing the model orbital trajectories into a dynamical orbit model and computing the dynamical orbit model to incorporate the model orbital trajectories;

using a Kalman filter/smoother to combine the computed dynamical orbit model with previously computed models to produce updated estimates of GPS parameters;

using the updated estimates of GPS parameters to propagate orbits forward in time to a next slow correction;

using the propagated orbits to calculate satellite ephemeris and clock corrections for the next slow correction; and outputting the next slow correction including satellite and ephemeris clock corrections to the users;

producing and outputting ionospheric maps indicating a magnitude of signal delay in ionospheric regions, producing ionospheric maps comprising the steps of:

weighting each data set according to the elevation angle of each GPS satellite relative to a receiving station receiving the data set;

processing the weighted data sets, predicted satellite and receiver frequency biases, and a previously computed ionospheric delay map using a Kalman filter/smoother and thereby computing a total electron content at a plurality of ionospheric points;

using the computed total electron content to update a Sun-fixed spherical ionospheric delay map; and outputting grid points of the updated ionospheric delay map to reflect changes in the ionospheric delay map; and periodically calculating and outputting a fast clock correction over a fast time period, calculating the fast clock correction comprising the steps of:

propagating GPS parameters from the most recent slow correction forward in time to an arrival of the next actual pseudorange data from the ground stations;

calculating predicted pseudoranges using the propagated GPS parameters;

differencing the predicted pseudoranges with the next actual pseudorange data;

accumulating at least one set of differences;

averaging accumulated differences for each satellite; and outputting the averaged differences to the users as the fast clock corrections for each satellite.

2. The real-time GPS method of claim 1, wherein the step of updating ionospheric delay maps further comprises computing and updating formal error maps showing estimated error of the ionospheric delay maps and wherein outputting grid points further comprises outputting grid points of the updated formal error maps.

3. The real-time GPS method of claim 1, wherein the Sun-fixed spherical ionospheric delay map describes a shell of electron density a fixed distance above Earth surface.

4. The real-time GPS method of claim 1, wherein the step of updating the Sun-fixed ionospheric delay maps employs $C^2$ bicubic spline functions to adjust values of adjacent grid points.

5. The real-time GPS method of claim 1, wherein the Sun-fixed spherical ionospheric delay map describes a three-dimensional electron profile with electron density varying with distance above Earth surface.

6. The real-time GPS method of claim 1, wherein the steps of calculating the fast clock correction further comprise the step of projecting the fast clock correction to a midpoint of a next fast time period by using a quadratic predictor selected to fit differences accumulated over an immediately previous fast time period.

7. The real-time GPS method of claim 1, wherein the steps of calculating the fast clock correction comprises the following steps:

propagating GPS parameters from the most recent slow correction forward in time to arrival of next actual pseudorange data from the ground stations;

solving a system of simultaneous equations to give estimated offsets for all receiver and all satellite clocks; and outputting the estimated offsets to the users as a fast clock corrections for each satellite.

8. The real-time GPS method of claim 1, wherein the GPS signals are compressed and accumulated by carrier-aided smoothing by averaging pseudorange measurements with carrier wave phase measurements over the slow time period to reduce pseudorange noise and derive a precise estimate of phase bias.

9. A device for providing real-time, wide-area differential GPS signals to allow users with a GPS receiver to obtain improved GPS positioning, the device comprising:

a digital computer with memory, execution means, input means and output means; and a program executing on the digital computer, the program comprising:

means for collecting real-time dual frequency GPS signals from a network of stationary receiving stations;

means for compressing and accumulating the GPS signals so that data received over a predetermined slow time period forms a single data point for each receiving station, the data points from the entire network forming a data set;

means for periodically producing and outputting a slow correction once each slow time period by processing the data sets through a dynamical orbit predictor module to produce calculated GPS satellite orbits in a real-time mode wherein processing occurs in a time period less than one slow time period, the predictor module comprising:

means for conditioning each data set with updated estimates of GPS parameters produced by the predictor module processing data sets from previous slow time periods;

means for computing model orbital trajectories from the conditioned data sets;

means for computing a dynamical orbit model incorporating the model orbital trajectories;

means for processing the dynamical orbit model in a Kalman filter/smoother combining the computed orbit model with previously computed models to produce updated estimates of GPS parameters;

means for using the updated estimates of GPS parameters for propagating the model orbits forward in time to a next slow correction;

means for using the propagated orbits for calculating satellite ephemeris and clock corrections for the next slow correction; and means for outputting the calculated next slow correction including satellite and ephemeris clock corrections to the users;

means for computing an ionospheric map indicating magnitude of signal delay in ionospheric regions, the means comprising:

means for weighting each data set according to elevation angle of each GPS satellite relative to the receiving station receiving the data set;

means for processing the weighted data sets, predicted satellite and receiver frequency biases, and a previously computed ionospheric delay map using a Kalman filter/smoother for computing total electron content at a plurality of ionospheric points;

means for updating a Sun-fixed spherical ionospheric delay map by using the computed total electron content; and means for outputting grid points of the updated ionospheric delay map to reflect changes in the ionospheric delay map; and means for periodically calculating and outputting a fast clock correction over a fast time period which is shorter than the slow time period, the means comprising:

means for propagating GPS parameters from a most recent slow correction forward in time to arrival of actual pseudorange data from the ground stations;

means for calculating predicted pseudoranges using the propagated GPS parameters;

means for differencing the predicted pseudoranges with actual pseudorange data;

means for accumulating at least one set of differences;

means for averaging accumulated differences for each satellite; and means for outputting the averaged differences to the users as a fast clock correction for each satellite.

10. The device of claim 9, wherein the Sun-fixed spherical ionospheric delay map describes a shell of electron density a fixed distance above Earth surface.

11. The device of claim 9, wherein the means for updating the Sun-fixed ionospheric delay maps employs $C^2$ bicubic spline functions to adjust values of adjacent grid points.

12. The device of claim 9, wherein the means for computing ionospheric delay maps further comprises means for computing and updating formal error maps showing estimated error of the ionospheric delay maps and means for outputting grid points further comprises means for outputting grid points of the updated formal error maps.

13. The device of claim 9, wherein the Sun-fixed spherical ionospheric delay map describes a three-dimensional electron profile with electron density varying with distance above Earth surface.

14. The device of claim 9, wherein the means for calculating the fast clock correction further comprises means for projecting the fast clock correction to a midpoint of a next fast time period by using a quadratic predictor selected to fit the differences accumulated over an immediately previous fast time period.

15. The device of claim 9, wherein the means for calculating the fast clock correction further comprises:

means for propagating GPS parameters from a most recent slow correction forward in time to coincide with a next expected arrival of pseudorange data from ground stations;

means for solving a system of simultaneous equations to calculate offsets for receiver and satellite clocks;

means for accumulating at least one set of satellite clock offsets;

means for averaging accumulated clock offsets for each satellite; and means for outputting the averaged offsets to the users as fast clock corrections for each satellite.

16. A device for providing real-time, wide area differential GPS navigation information comprising:

a digital computer with memory, execution means, input means and output means; and a program executing on the digital computer, the program comprising:

means for collecting real-time dual frequency GPS signals from a network of stationary receiving stations;

means for accumulating the GPS signals from the network of stationary receiving stations, said signals comprising pseudorange and carrier phase data, and compressing the data so that data received over a predetermined slow time period is reduced to a data point for each receiving station, the data points from the entire network being stored in a data set, said means including means for carrier-aided smoothing by averaging pseudorange measurements with carrier phase measurements over the slow time period;

means for periodically producing and outputting a slow correction once each slow time period by processing the data sets through a dynamical orbit predictor module to produce calculated GPS satellite orbits in a real-time mode wherein processing occurs in a time period less than one slow time period, the predictor module comprising:

means for conditioning each data set with updated estimates of GPS parameters produced by the predictor module processing data sets from previous slow time periods;

means for computing model orbital trajectories from the conditioned data sets;

means for computing a dynamical orbit model incorporating the model orbital trajectories;

means for processing the dynamical orbit model in a Kalman filter/smoother combining the computed orbit model with previously computed models to produce updated estimates of GPS parameters;

means for using the updated estimates of GPS parameters for propagating the model orbits forward in time to a next slow correction;

means for using the propagated orbits for calculating satellite ephemeris and clock corrections for the next slow correction; and means for outputting the calculated next slow correction including satellite and ephemeris clock corrections to the users;

means for computing an ionospheric map indicating magnitude of signal delay in ionospheric regions; and means for periodically calculating and outputting a fast clock correction over a fast time period which is shorter than the slow time period, the means comprising:

means for propagating GPS parameters from a most recent slow correction forward in time to arrival of actual pseudorange data from the ground stations;

means for calculating predicted pseudoranges using the propagated GPS parameters;

means for differencing the predicted pseudoranges with actual pseudorange data;

means for accumulating at least one set of differences;

means for averaging accumulated differences for each satellite; and means for outputting the averaged differences to the users as a fast clock correction for each satellite.

* * * * *